United States Patent
Taki et al.

(10) Patent No.: US 6,496,542 B1
(45) Date of Patent: Dec. 17, 2002

(54) DIGITAL COMMUNICATION SYSTEM

(75) Inventors: Masahiro Taki, Tokyo (JP); Yukio Yoshimura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/182,888

(22) Filed: Oct. 30, 1998

(30) Foreign Application Priority Data

Oct. 30, 1997 (JP) ............................................. 9-298008

(51) Int. Cl.[7] .......................... H04L 27/20; H04L 27/22
(52) U.S. Cl. ...................... 375/281; 375/308; 375/332; 329/304; 332/103
(58) Field of Search ................................ 375/279, 280, 375/281, 283, 308, 329, 330, 331, 332; 329/304; 332/103

(56) References Cited

U.S. PATENT DOCUMENTS

| | | | | |
|---|---|---|---|---|
| 4,083,009 A | * | 4/1978 | Bickford et al. | 375/347 |
| 4,615,040 A | * | 9/1986 | Mojoli et al. | 375/267 |
| 5,157,688 A | * | 10/1992 | Dell-Imagine | 375/130 |
| 5,309,482 A | * | 5/1994 | Wright et al. | 375/350 |
| 5,546,190 A | * | 8/1996 | Hill et al. | 359/158 |
| 5,956,328 A | * | 9/1999 | Sato | 370/335 |
| 5,978,412 A | | 11/1999 | Takai | 375/200 |
| 5,987,068 A | * | 11/1999 | Cassia et al. | 375/281 |
| 6,028,894 A | * | 2/2000 | Oishi et al. | 375/227 |

FOREIGN PATENT DOCUMENTS

| | | |
|---|---|---|
| JP | 51-22767 | 7/1976 |
| JP | 52-149411 | 12/1977 |
| JP | 7-321861 | 12/1995 |
| JP | 8-154105 | 6/1996 |

* cited by examiner

Primary Examiner—Young T. Tse
(74) Attorney, Agent, or Firm—Foley & Lardner

(57) ABSTRACT

Disclosed is a digital communication system for mobile communication, which has: a transmitter for mixing and outputting outputs from two independent and equivalently synchronized transmitting circuits in a π/4 shift QPSK modulation system; and a receiver for receiving a mixed wave transmitted from the transmitting circuits and demodulating the received signal by using information as to its phase and amplitude.

1 Claim, 14 Drawing Sheets

TRANSMITTING SYSTEM

RECEIVING SYSTEM

○: SIGNAL ALLOCATION POINT
↑: REFERENCE SIGNAL (SIGNAL OF ONE TIMING BEFORE)

○: GROUP OF SIGNAL ALLOCATION POINTS
  WHERE SIGNAL EXISTS AT PRESENT
△: GROUP OF SIGNAL ALLOCATION POINTS
  THAT CAN SHIFT AT THE NEXT TIMING
↑: REFERENCE SIGNAL (SIGNAL OF ONE TIMING BEFORE)

| | P | Q | P' | Q' |
|---|---|---|---|---|
| (1) | $2^{1/2}+1$ | 1 | $2^{1/2}+1$ | -1 |
| (2) | 1 | $2^{1/2}-1$ | 1 | $-2^{1/2}+1$ |
| (3) | $2^{1/2}+1$ | -1 | 1 | $-2^{1/2}-1$ |
| (4) | 1 | $-2^{1/2}-1$ | $2^{1/2}-1$ | -1 |
| (5) | 1 | $2^{1/2}-1$ | 1 | $-2^{1/2}-1$ |
| (6) | $2^{1/2}-1$ | -1 | $-2^{1/2}+1$ | -1 |
| (7) | 1 | $2^{1/2}-1$ | $-2^{1/2}-1$ | -1 |
| (8) | $-2^{1/2}+1$ | -1 | -1 | $-2^{1/2}+1$ |
| (9) | $-2^{1/2}-1$ | -1 | $-2^{1/2}-1$ | 1 |
| (10) | -1 | $-2^{1/2}+1$ | -1 | $2^{1/2}-1$ |
| (11) | $-2^{1/2}-1$ | 1 | -1 | $2^{1/2}+1$ |
| (12) | -1 | $2^{1/2}-1$ | $-2^{1/2}+1$ | 1 |
| (13) | -1 | $2^{1/2}+1$ | 1 | $2^{1/2}+1$ |
| (14) | $-2^{1/2}+1$ | 1 | $2^{1/2}-1$ | 1 |
| (15) | 1 | $2^{1/2}+1$ | $2^{1/2}+1$ | 1 |
| (16) | $2^{1/2}-1$ | 1 | 1 | $2^{1/2}-1$ |

(SIGNALS ARE IDENTIFIED BY VOLTAGES DETECTED AT P, Q, P⁻,Q⁻)

TRANSMITTING SYSTEM

RECEIVING SYSTEM

○: SIGNAL ALLOCATION POINT AT PRESENT

○: SIGNAL ALLOCATION POINT AT PRESENT

DIGITAL COMMUNICATION SYSTEM

FIELD OF THE INVENTION

This invention relates to a digital communication system, and more particularly to a digital communication system using π/4 shift QPSK modulation system for mobile digital communications.

BACKGROUND OF THE INVENTION

In conventional mobile communication systems, lightening of terminal device and minimization of volume have been key factors. To realize the lightening of terminal device and the minimization. of volume, in particular, the minimization of battery volume is an important problem. Along with this problem, π/4 shift QPSK modulation system with low consumed power has been widely used.

In a conventional PSK modulation system (eight-value PSK system), as shown in FIG. 1, signal allocation points (shown by a circle in FIG. 1) that can be shift to at the next time are eight, and 3-bit information from 000 to 111 is assigned by those signals and a reference signal (signal of one timing before) shown by an arrow in FIG. 1.

On the other hand, comparing with the PSK modulation system, in the π/4 shift QPSK modulation system, as shown in FIG. 2, eight signal allocation points are divided into two groups. When a signal exists on any point of one group of signal allocation points (shown by a circle in FIG. 2) at certain timing, the signal can shift to any point of another group of signal allocation points (shown by a triangle in FIG. 2) at the next timing. Therefore, the amount of information transmittable is four (2-bit) whereas the signal allocation points is eight (3-bit). Meanwhile, in FIG. 2. arrows indicate a reference signal (signal of one timing before).

In the π/4 shift QPSK modulation system, the amplitude variation of signal is small and the deterioration and spectrum dispersion on non-linear transmission line is small because the spectrum of modulated wave is phase-shifting without passing the zero point on the signal diagram.

Therefore, this is a very excellent modulation system for mobile communication terminals that have many limitations as to weight, volume, battery capacity, anti-adjacent-channel-interference characteristic etc.

However, in the π/4 shift QPSK modulation system, there is the demerit that the amount of information transmitted, $2^2$ (2-bit), is small by one bit, as compared with the number of signal allocation points, which is $2^3$ (3-bit)

SUMMARY OF THE INVENTION

Accordingly, it is an object of the invention to provide a digital communication system that the transmission capacity is increased.

According to the invention, a digital communication system for mobile communication, comprises:

two independent transmitting systems;

wherein the digital communication system transmits carrying two π/4 shift QPSK modulated waves on a same frequency while preventing the dispersion of spectrum.

According to another aspect of the invention, a digital communication system for mobile communication, comprises:

means for mixing and outputting outputs from two independent and equivalently synchronized transmitting circuits in π/4 shift QPSK modulation system: and means for receiving a mixed wave transmitted from the transmitting circuits and demodulating the received signal by using information as to its phase and amplitude.

According to another aspect of the invention, a digital communication system for mobile communication, comprises the steps of:

mixing signals in π/4 shift QPSK modulation system to be output from two independent and equivalently synchronized transmitting systems on a same frequency;

transmitting the mixed signal as an output signal; and demodulating the mixed signal into a bit string from information as to its phase and amplitude;

wherein signal allocation points which are not used in π/4 shift QPSK modulation system is used by mixing the two independent and equivalently synchronized π/4 shift QPSK modulated signals.

BRIEF DESCRIPTION OF THE DRAWINGS

The invention will be explained in more detail in conjunction with the appended drawings, wherein.

DESCRIPTION OF THE PREFERRED EMBODIMENTS

A digital communication system in the preferred embodiment according to the invention will be explained below. In the digital communication system of the invention, means for mixing and outputting outputs (same frequency) from two independent and equivalently-synchronized transmitting circuits of $\pi/4$ shift QPSK modulation system is provided.

Figure 1:
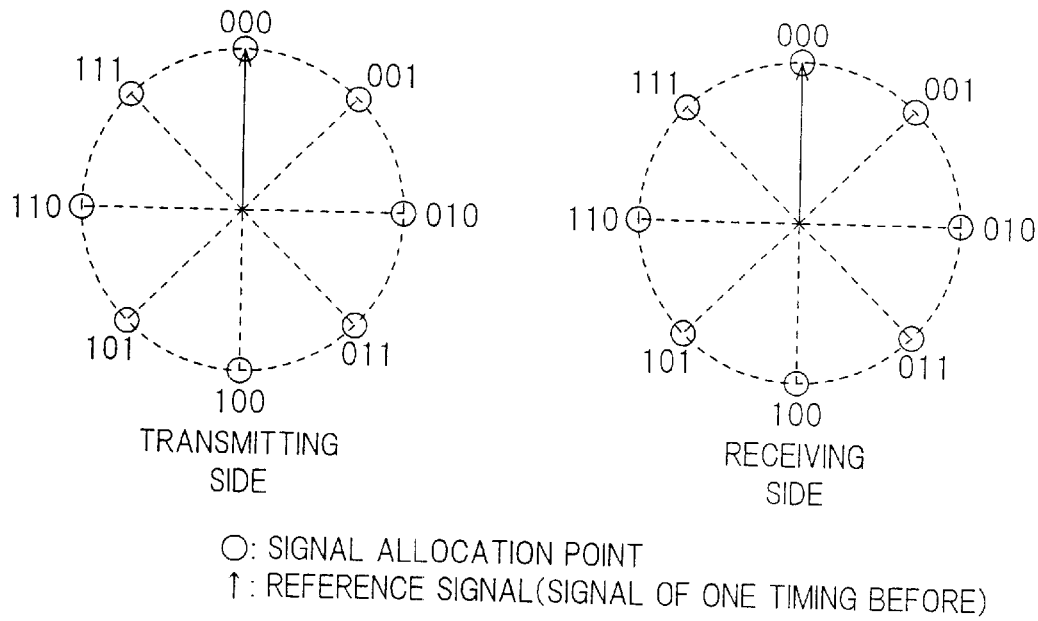
FIG. 1 is an illustration showing the signal allocation point and the amount of information in a conventional PSK modulation system.
Figure 2:
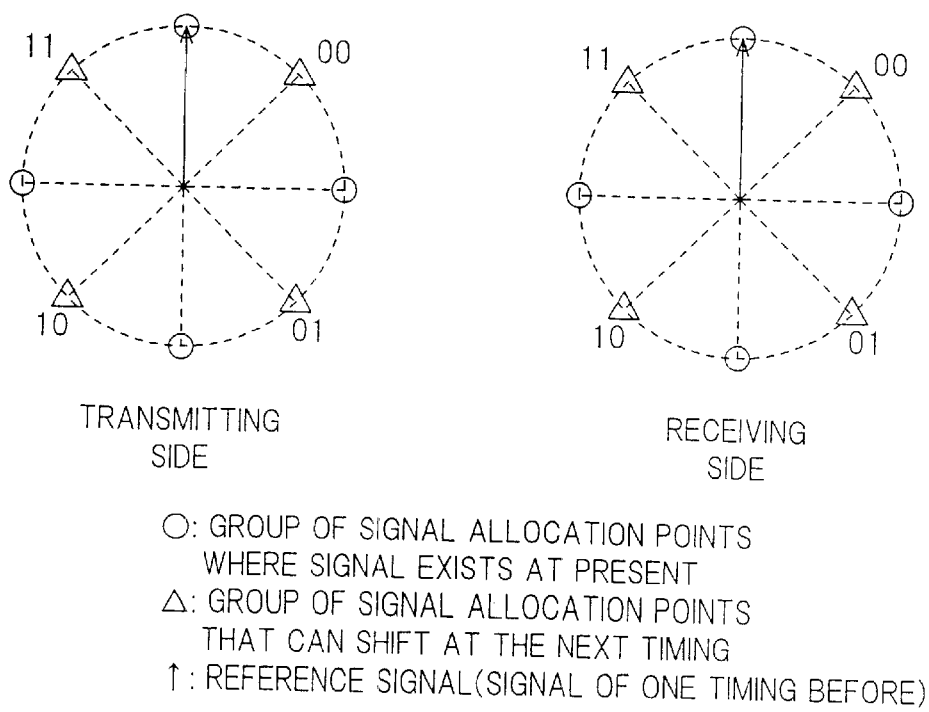
FIG. 2 is an illustration showing the signal allocation point and the amount of information in a conventional π/4 shift QPSK modulation system.
Figure 3:
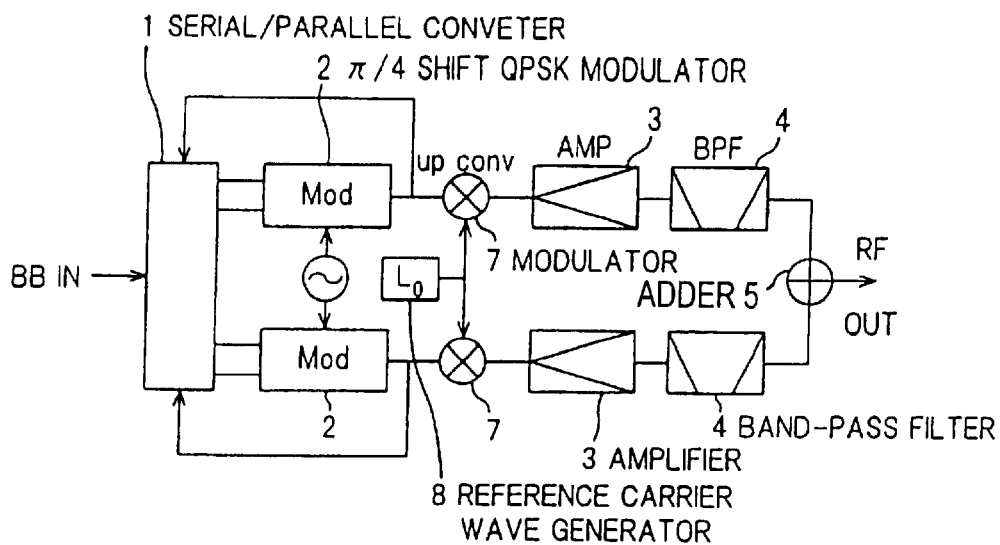
FIG. 3 is a block diagram showing the transmitting circuit of a digital communication system in a preferred embodiment according to the invention.

Referring to FIG. 3, the transmitting circuit comprises a serial/parallel converter 1, a $\pi/4$ shift QPSK modulator 2, an amplifier (AMP) 3, a band-pass filter (BPF) 4, an adder 5, a modulator 7, and a reference carrier wave generator 8.

Figure 4:
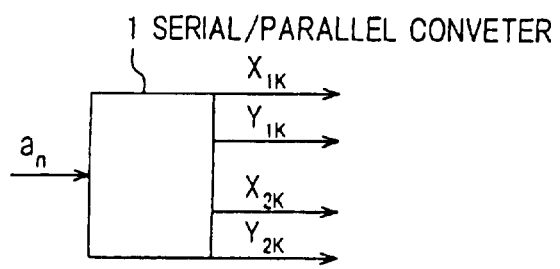
FIG. 4 is an illustration showing a serial/parallel converter in the transmitting circuit in FIG. 3.

The serial/parallel converter 1, as shown in FIG. 4, converts an input serial signal (BB IN) $a_n$ into two symbols of $(X_{1k}, Y_{1k})$, $(X_{2k}, Y_{2k})$.

For example, when $a_n = \ldots, a_n, a_n+1, a_n+2, a_n+3, \ldots$, $(X_{1k}, Y_{1k})=(a_n, a_{ns}+1)$, and $(X_{2k}, Y_{2k})=(a_n+2, a_n+3)$ are obtained. $(a_n, a_n+1, a_n+2, a_n+3)$ are digital data to take 0 or 1.

Figure 5:
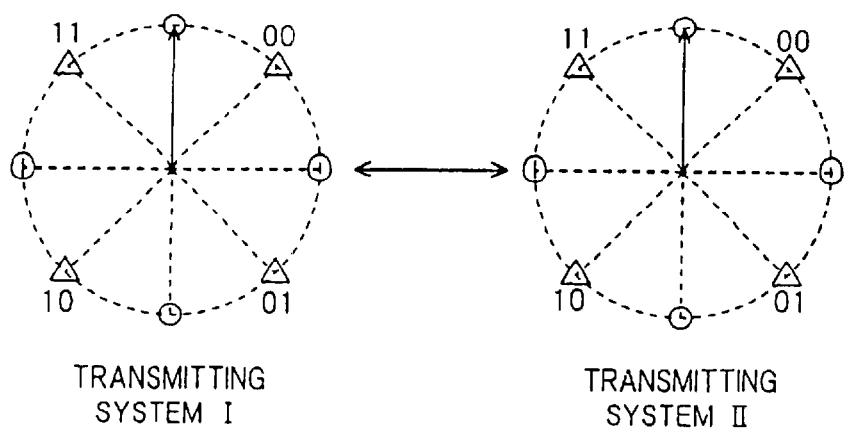
FIG. 5 is an illustration showing transmitting systems in π/4 shift QPSK modulators in FIG. 3.

FIG. 5 shows transmitting systems I, II of the $\pi/4$ shift QPSK modulator shown in FIG. 3. The $\pi/4$ shift QPSK modulator 2 outputs a $\pi/4$ shift QPSK modulated wave, based on the outputs $(X_{1k}, Y_{1k})$, $(X_{2k}, Y_{2k})$ of the serial/parallel converter 1. Here, the two $\pi/4$ shift QPSK modulators 2 are synchronized each other so that, between the signal allocation points divided into two groups (circle group and triangle group in FIG. 5), a signal is not allocated in a same group at same timing. Meanwhile, in FIG. 5, arrows indicate a reference signal (signal of one timing before).

Figure 6:
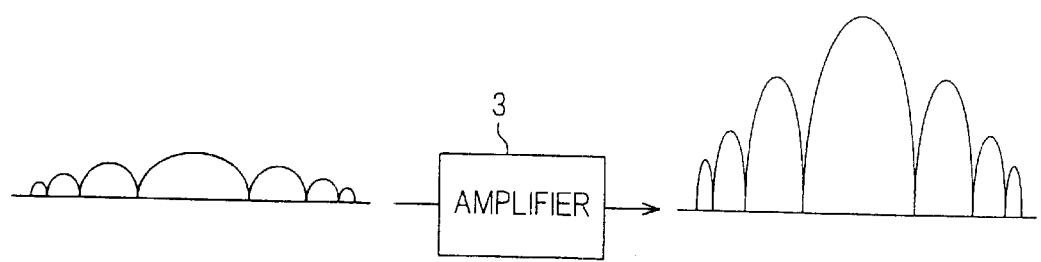
FIG. 6 is an illustration showing the state of wave through an amplifier in FIG. 3.
Figure 7:
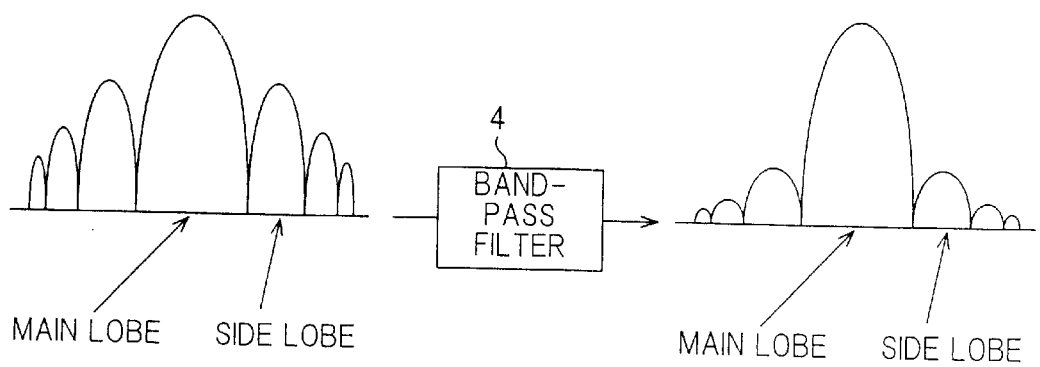
FIG. 7 is an illustration showing the state of wave through a band-pass filter in FIG. 3.
Figure 8:
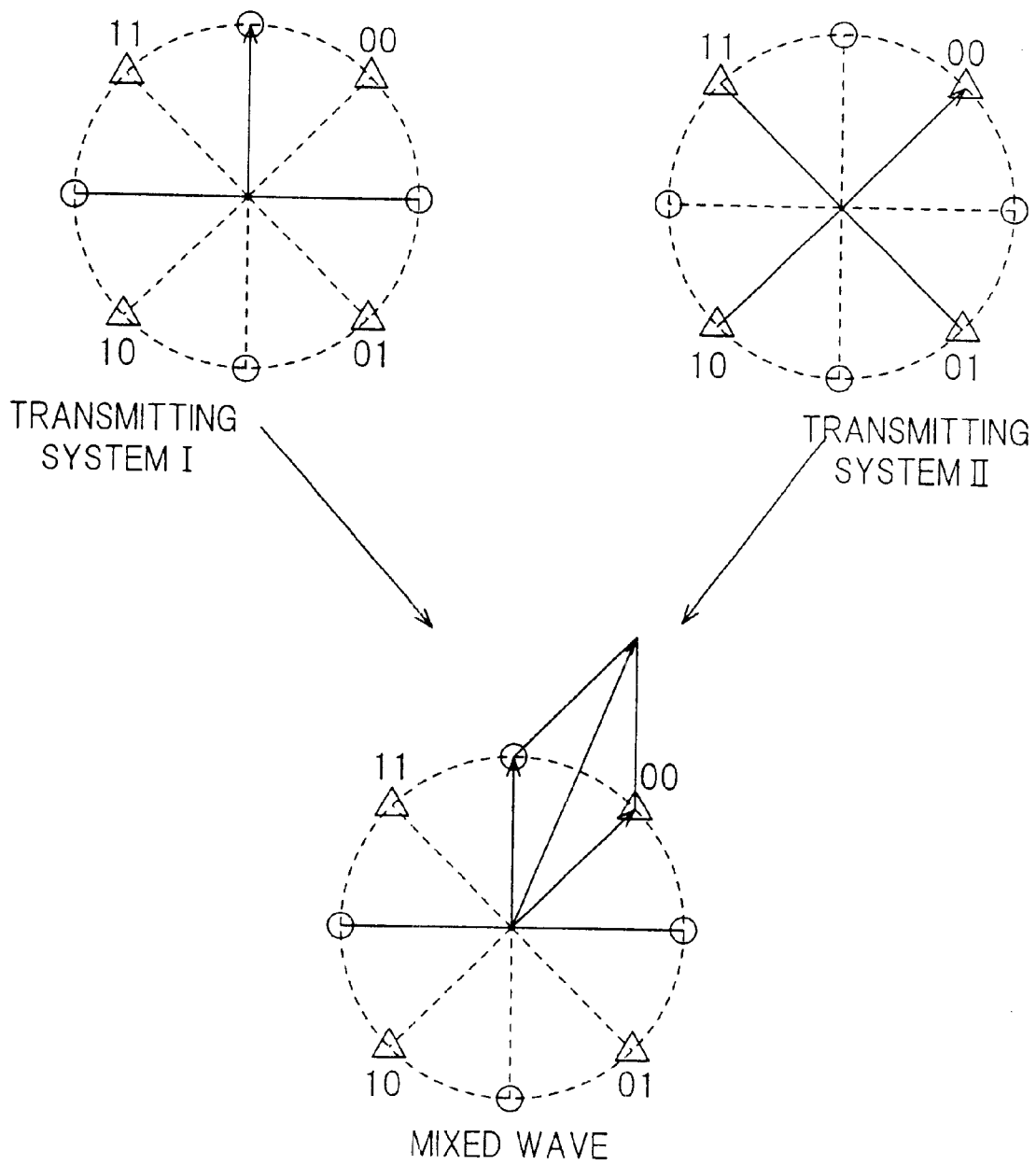
FIG. 8 is an illustration showing the mixing through the mixer in FIG. 3.

The amplifier 3, as shown in FIG. 6, amplifies the output of the $\pi/4$ shift QPSK modulator 2 so that it can be transmitted up to a certain distance. The band-pass filter 4, as shown in FIG. 7, removes broadened part (side lobes on both sides of main lobe) of the $\pi/4$ shift QPSK modulated wave so as to prevent the interference or adjacent frequency. The mixer 7, as shown in FIG. 8, mixes the $\pi/4$ shift QPSK modulated waves passing through the band-pass filters 4 from the transmitting systems I, II. In the transmitting circuit, part including a non-linear circuit such as the amplifier 3 etc. uses the two independent $\pi/4$ shift QPSK modulation systems. Therefore, the reproduction of side lobes on both sides of main lobe that causes the adjacent-channel interference can be prevented.

Figure 9:
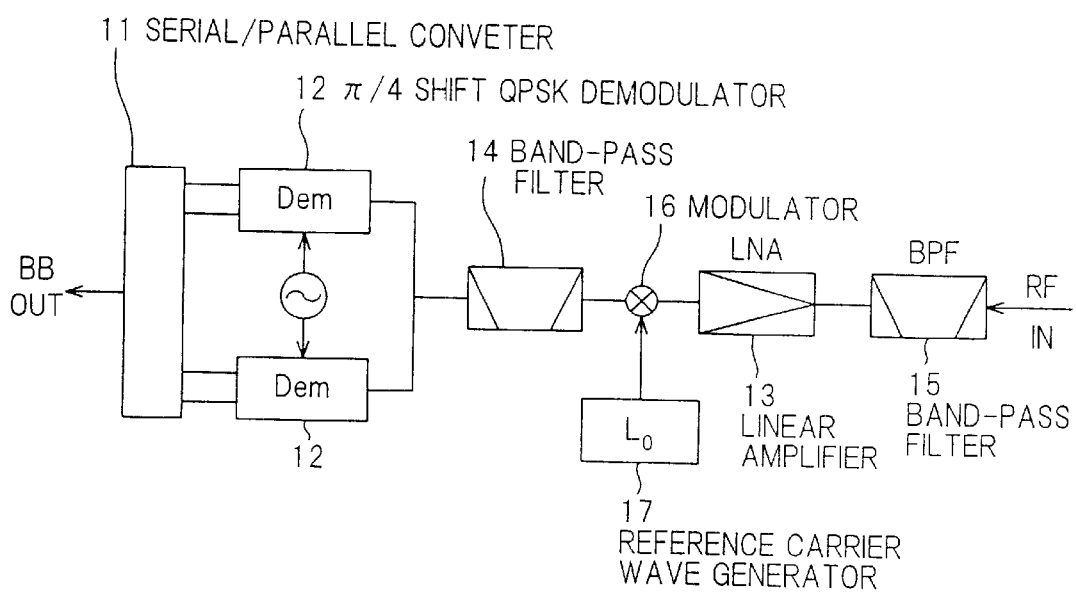
FIG. 9 is a block diagram showing the receiving circuit of a digital communication system in the preferred embodiment according to the invention.

Further, the receiving circuit, as shown in FIG. 9, has means for receiving a mixed wave RF (RF IN) transmitted from the above transmitting circuit and demodulating the transmitted signal by using information as to its phase and amplitude. The receiving circuit comprises a serial/parallel converter 11, a $\pi/4$ shift QPSK demodulator (Dem) 12, a band-pass filter 14, a linear amplifier (LNA) 13, a band-pass filter (BPF) 15, a modulator 16, and a reference carrier wave generator (Lo) 17.

On the receiving side, the received mixed wave RF can be demodulated into a bit string from the information as to phase and amplitude because the two transmitting systems I, II are synchronized each other and signals transmitted from the transmitting systems I, II are not allocated to a same coordinates system.

Figure 10:
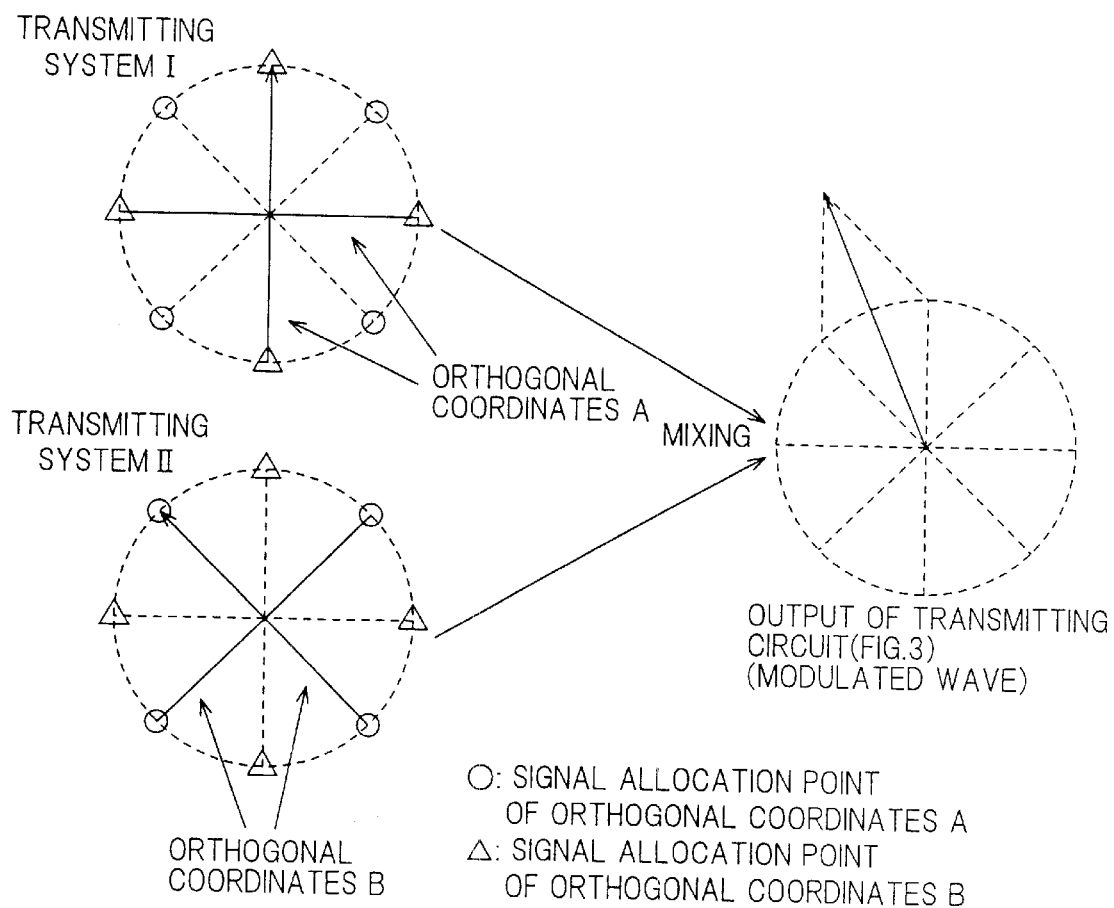
FIG. 10 is an illustration showing signal allocation points of transmitted modulated wave in the preferred embodiment according to the invention.

In the digital communication system of the invention, as shown in FIG. 10, the independent and equivalent transmitting systems I, II are provided, eight signal points on a same frequency in $\pi/4$ shift QPSK demodulation system are divided into two pair of orthogonal coordinates (coordinates A, B), and the signals of each of the transmitting systems I, II are allocated to the orthogonal coordinates A, B different each other. Meanwhile, in FIG. 10, a circle indicates the signal allocation point of the orthogonal coordinates A, and a triangle indicates the signal allocation point of the orthogonal coordinates B. The mixed wave of the two transmitting systems I, II becomes the output (modulated wave) of the transmitting circuit shown in FIG. 3.

Figures 11, 12:
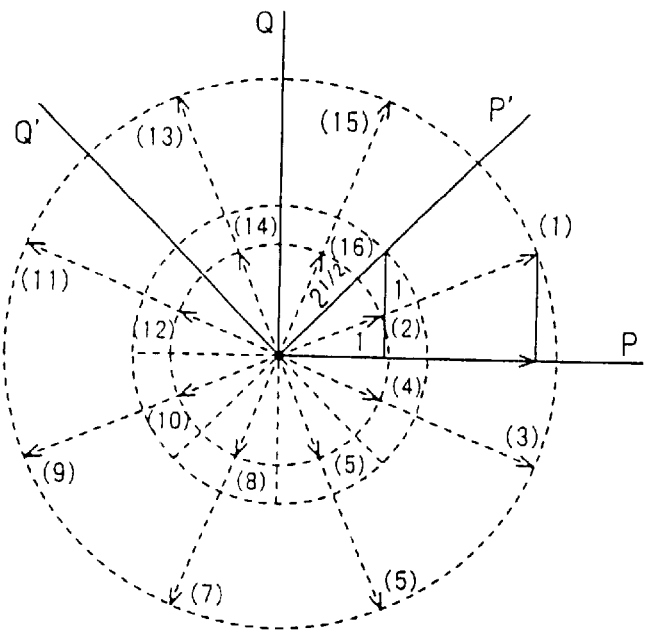
FIG. 11 is an illustration showing signal allocation points for explaining the way of identifying a received signal in the preferred embodiment according to the invention.
FIG. 12 is an illustration showing signal allocation points for explaining the way of identifying a received signal in the preferred embodiment according to the invention.

As shown in FIGS. 11 and 12, with the two transmitting systems I, II synchronizing with each other, signals transmitted from the two transmitting systems I, II can avoid being allocated to a same coordinates system. The receiving side can demodulate a mixed wave RF into a bit string from information as to phase and amplitude.

In the digital communication system of the invention, two groups of 2-bit signals can be transmitted because the signals in $\pi/4$ shift QPSK demodulation system to be transmitted from the two independent and equivalent transmitting systems on a same frequency are mixed. The signals are identified by voltages detected at P, Q, P' and Q'.

Figure 13:
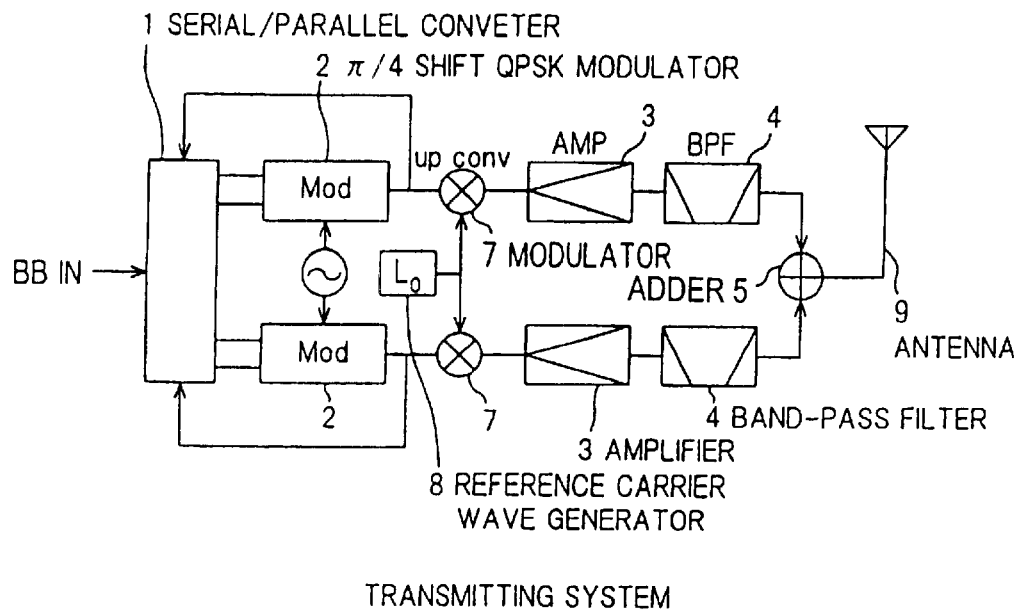
FIG. 13 is a block diagram showing the communication system composition of the digital communication in the preferred embodiment according to the invention.
Figure 13:
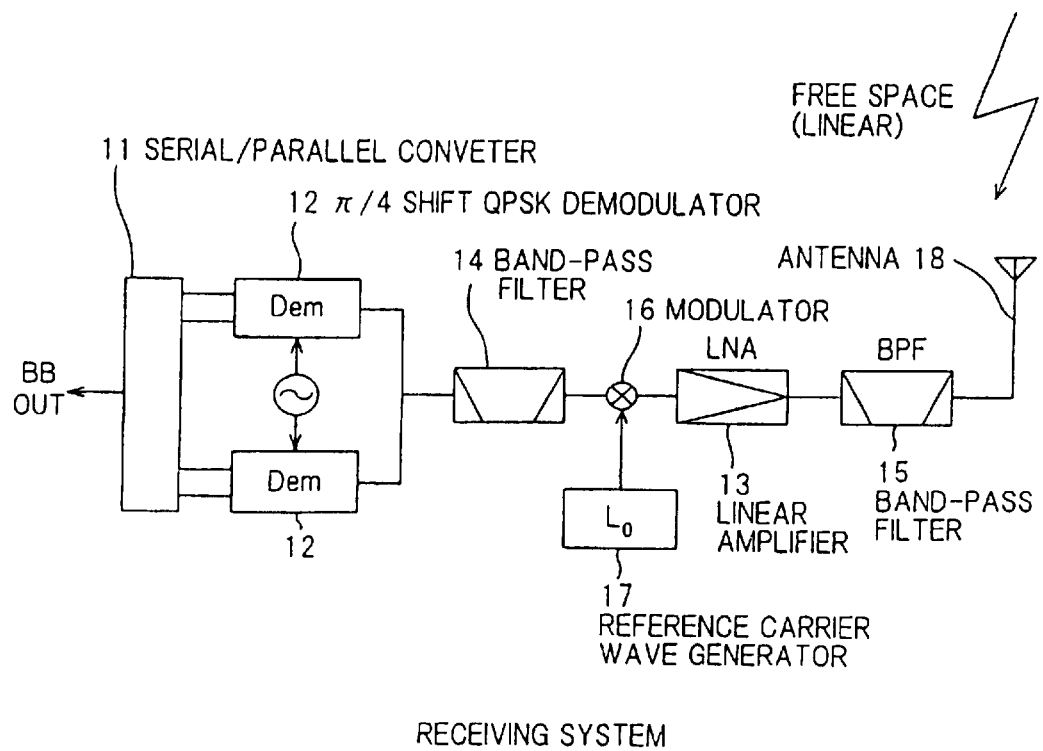

Further, FIG. 13 shows a communication system composition of the digital communication system in the embodiment of the invention shown in FIGS. 3 and 9. The mixed wave RF transmitted from the transmitting circuit is output from an antenna 9 to the free space (linear), received by an antenna 18 of the receiving system.

In the transmitting circuit. signals from the two independent $\pi/4$ shift QPSK modulation systems are transmitted through part including a non-linear circuit such as the amplifier 3 etc. Therefore, the reproduction of side lobes that causes the adjacent-channel interference can be prevented. Side lobes occurring by non-linear part in the receiving circuit does not cause the adjacent-channel interference any more.

Also, a serial data input is transmitted as a difference from a signal of one timing before. Therefore, a delay detection demodulation system can be applied to the receiving circuit, and the present communication system can be applicable even under fast fading such as mobile communication.

Figure 14:
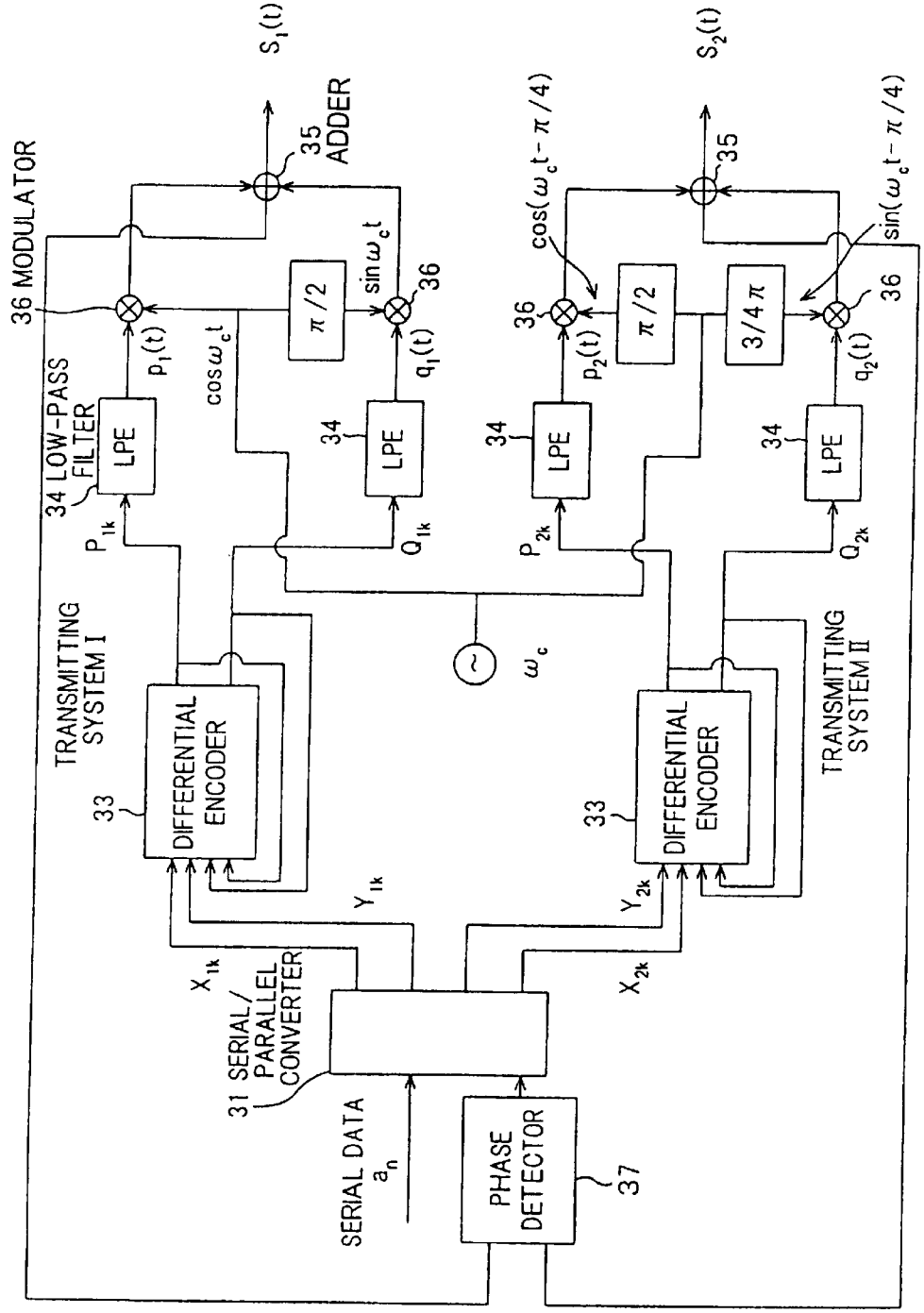
FIG. 14 is a block diagram showing the transmitting circuit using an orthogonal modulator in the preferred embodiment according to the invention.

Next, FIG. 14 shows a transmitting circuit where, in the present communication system, an orthogonal modulator is used as the $\pi/4$ shift QPSK modulator 36. The transmitting circuit comprises a serial/parallel converter 31, a differential encoder 33, a low-pass filter (LPF) 34, an adder 35, and a modulator 36.

The serial/parallel converter 31 converts an input serial signal $a_n$ into two symbols of $(X_{1k}, Y_{1k})$, $(X_{2k}, Y_{2k})$.

As shown in FIG. 14, the transmitting circuit of the present modulation system outputs the mixed wave of output $S_1(t)$ and $S_2(t)$ from the two $\pi/4$ shift QPSK modulation circuits of the transmitting systems I and II. The phase of carrier wave frequency is forwarded by $\pi/4$ than the carrier wave of the transmitting system I so that it has coordinates $\pi/4$-shifted from the coordinates of the transmitting systems I, II.

Also, when a bit string of serial 4-bit is converted into parallel, comparing between the phase of output $S_1(t)$ of the transmitting system I and the phase of output $S_2(t)$ of the transmitting system I on the previous time, high-order 2 bits of 4 bits are assigned to the transmitting system with the forward phase and low-order 2 bits are assigned to the transmitting system with the backward phase.

This is conducted for the purpose of making the demodulation procedure simple when the receiving circuit demodulates a signal transmitted from the transmitting circuit. If this operation is not conducted, a complicated processing is needed when demodulated data of four 0 and 1 is converted into the original 4-bit serial data.

Figure 15:
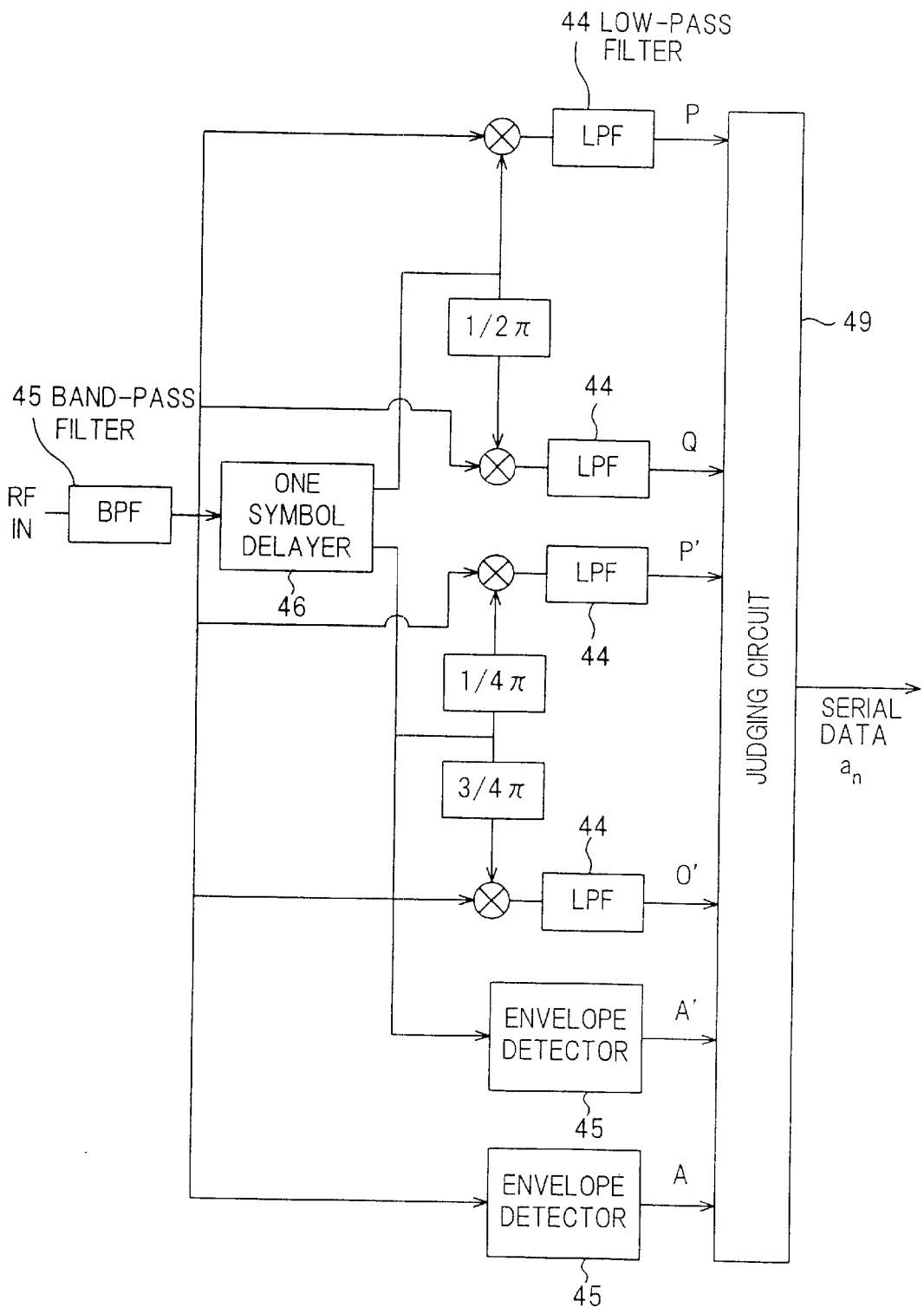
FIG. 15 is a block diagram showing the receiving circuit using delay detection in the preferred embodiment according to the invention.

Next, FIG. 15 shows a receiving circuit where, in the present communication system, the demodulator uses delay detection The receiving circuit, as shown in FIG. 15, comprises a band-pass filter (BPF) 45, a one-symbol delayer 46, a low-pass filter (LPF) 44, an envelope detector 45, and a judging circuit 49.

This demodulating circuit judges an input signal by using a phase difference between the received signal and a received signal of one symbol before and their amplitudes, outputting a bit string.

Figure 16:
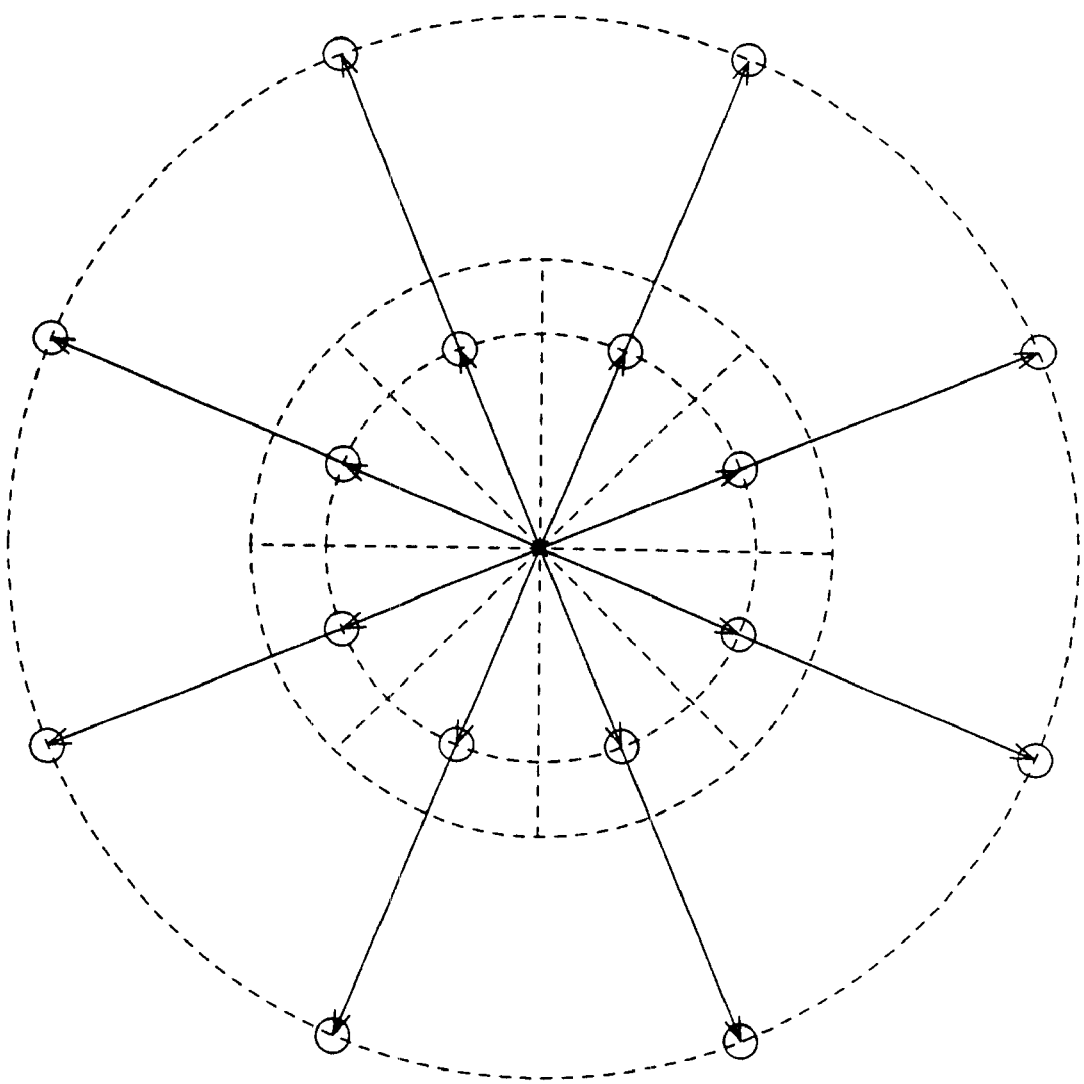
FIG. 16 is an illustration showing signal allocation points in the preferred embodiment according to the invention.

Next, the operation of the embodiment of the invention will be detailed. FIG. 16 shows signal allocation points in the present communication system. Though there are sixteen signal allocation points in the present communication system, it will be appreciated that the signal-to-signal distance is long and the error rate is improved, compared with the PSK modulation system.

Figure 17:
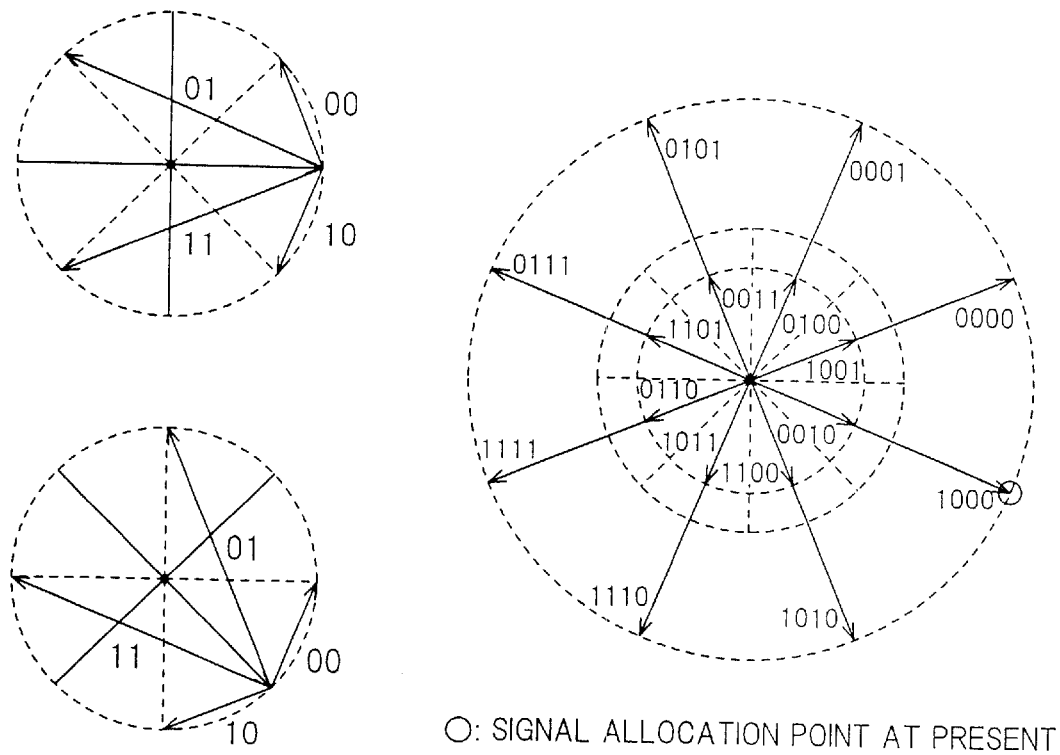
FIG. 17 is a signal-shift diagram showing a shifting of signal point in the case that a present signal point exists on the outer circle.
Figure 18:
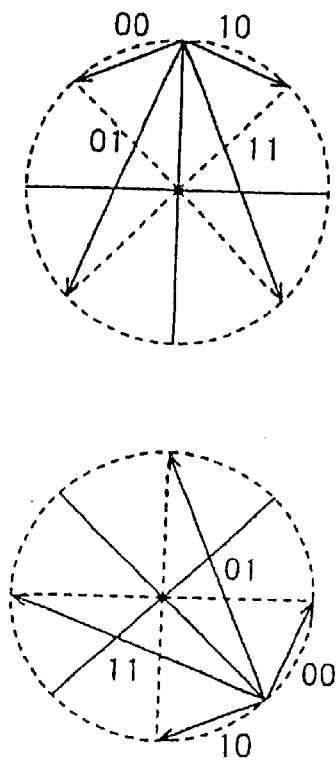
FIG. 18 is a signal-shift diagram showing a shifting of signal point in the case that a present signal point exists on the inner circle.
Figure 18:
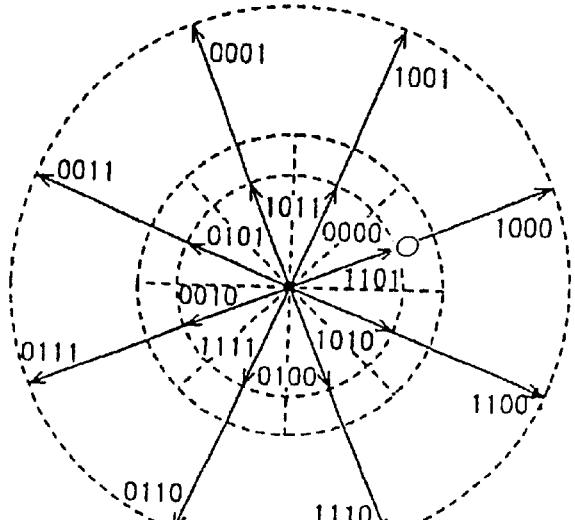

The modulated wave in the present communication system is a mixed wave of two $\pi/4$ shift QPSK modulated waves, and therefore bit-string signal is converted into difference information from a wave of one symbol before and then transmitted. FIGS. 17 and 18 are signal-shift diagrams showing where a present signal point of the mixed wave as the output of the transmitting circuit will shift when inputting a bit string of 0000 to 1111. FIG. 17 shows the case that the present signal point exists on the outer circle. FIG. 18 shows the case that the present signal point exists on the inner circle. As shown in FIG. 17, the shifting way of signal point is classified into two patterns, depending on that the present signal point exists on the outer circle or on the inner circle.

From the transmitting circuit shown in FIG. 14, such a signal as shown in FIGS. 17 and 18 is output. The receiving circuit in FIG. 15 receives such a signal as shown in FIGS. 17 and 18 as a received wave, judging the shifting pattern of signal point based on the amplitude of a signal of one symbol before, detecting the phase difference between the signal one symbol before and the received signal, demodulating it into two groups of 2-bit serial data.

Figure 19:
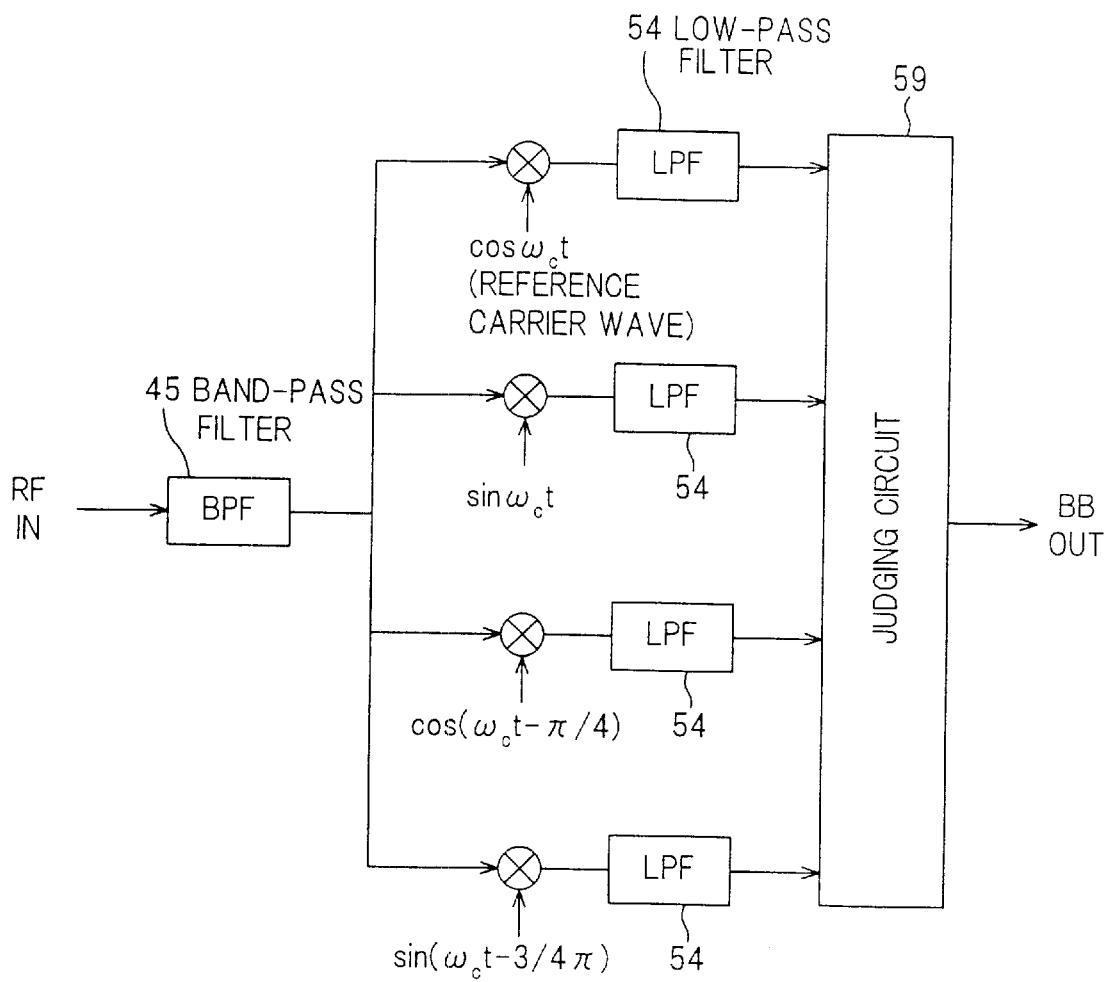
FIG. 19 is a block diagram showing the receiving circuit using synchronous detection in the preferred embodiment according to the invention.

Though the receiving circuit using delay detection is shown as the embodiment of the present communication system, synchronous detection, frequency detection etc. can be also used as the demodulating circuit. FIG. 19 shows an example of receiving circuit using synchronous detection. In FIG. 19, the receiving circuit comprises a band-pass filter (BPF) 55, a low-pass filter (LPF) 54, is and a judging circuit 59.

Advantages of the Invention

As explained in the above embodiment, the first advantage in the digital communication system of the present invention is that two 2-bit signals or one 4-bit signal can be simultaneously transmitter on one frequency, thereby duplicating the transmission capacity of $\pi/4$ shift QPSK modulation system, because or $\pi/4$ shift QPSK modulated signals output from two independent and equivalently synchronized transmitting systems are mixed on a same frequency.

The second advantage is that a sixteen-value modulation type of digital communication system available even under the circumstance proper to mobile communications such as fast fading can be realized because the side lobe reproduction can be suppressed by dividing the non linear part of transmitting circuit into two systems and using the $\pi/4$ shift QPSK modulation system for each system, and because a delay detection demodulation system applicable even in case of severe phase variation can be used.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method in a system for mobile communication, comprising:

combining two $\pi/4$ shift QPSK modulated signals produced by respective independent and synchronized modulation circuits at the same frequency, each of the modulation circuits using different subsets of $\pi/4$ shift QPSK modulation signal allocation points;

transmitting the combined signal as an output signal; and demodulating the combined signal into a bit string from information as to its phase and amplitude;

wherein the combined signal comprises signal allocation points that are formed from combinations of different $\pi/4$ shift QPSK modulation signal allocation points.

* * * * *